United States Patent [19]

Goulding

[11] Patent Number: 4,927,716
[45] Date of Patent: May 22, 1990

[54] SURFACE TREATMENT FOR RECORDING MEDIA

[75] Inventor: Terence Goulding, Garswood, England

[73] Assignee: Imperial Chemical Industries PLC, London, England

[21] Appl. No.: 84,855

[22] Filed: Aug. 13, 1987

[30] Foreign Application Priority Data

Aug. 21, 1986 [GB] United Kingdom ............... 8620338
Oct. 7, 1986 [GB] United Kingdom ............... 8624021

[51] Int. Cl.$^5$ .............................................. G11B 5/64
[52] U.S. Cl. .................................... 428/695; 427/131; 428/900

[58] Field of Search ............... 428/403, 695, 900; 427/131, 132

[56] References Cited

U.S. PATENT DOCUMENTS

| 4,446,193 | 5/1984 | Afzali-Ardakani | 427/131 |
| 4,578,313 | 3/1986 | Ito | 428/403 |
| 4,588,656 | 5/1986 | Kitamoto | 427/131 |

Primary Examiner—Paul J. Thibodeau
Attorney, Agent, or Firm—Cushman, Darby & Cushman

[57] ABSTRACT

A method for improving the abrasion resistance of an electroless plated ferromagnetic recording layer of a video tape comprises applying a solution of a long chain organic peroxide, e.g. lauroyl peroxide, to the surface.

8 Claims, No Drawings

SURFACE TREATMENT FOR RECORDING MEDIA

The invention relates to surface treatment of magnetic recording materials and particularly to a method for treating the surface of an electroless plated ferromagnetic recording layer to enhance the abrasion resistance of the layer.

Video tapes, i.e. tapes carrying a layer of magnetic recording medium used for recording and playing back electromagnetic signals used to drive a television set or TV monitor, require considerable abrasion resistance if they are not to be damaged during use. In use, the tapes are held against a rapidly rotating recording head, and where resistance to abrasion is inadequate, parts of the recording layer can be abraded away very rapidly by the head. Abrasion damage is especially likely to occur during playback of still frames where the tape is stationary so that the head is rotated against the same portion of tape during the period of playback.

It has been proposed to apply a protective layer over the recording layer. However, it is important for efficient recording that the distance between the head and the recording medium be minimised, and this prevents the use of substantial protective layers overlying the recording medium, as such layers would necessarily come between the recording medium and the head.

The present invention is directed towards providing alternative means for improving the abrasion resistance of recording media by chemical treatment, and is particularly applicable to video tapes because of the abrasive environment in which such tapes are used. The treatment is not limited by the type of substrate supporting the recording layer, and the invention is equally applicable whether the recording medium overlies a tape or any other supporting material which is inert to the chemicals used in the treatment.

Most commercial video tapes at the present time have recording layers comprising metal oxides although a recent introduction is tapes in which the recording layer comprises a ferromagnetic metal, such as cobalt, evaporated onto one surface of a prestretched polymer tape, often with an adhesion-promoting layer between the polymer tape and the recording layer. The metals can, however, be deposited onto the tape by methods other than evaporation, although the nature of the metal particles in the recording layer and their structures are determined initially by their manner of deposition and the physical and chemical properties of metal layers formed in different ways may differ considerably. A recent and particularly economical method of depositing metals to form layers of high magnetic performance, is that of electroless plating (EP), in which the metal is chemically deposited from (usually aqueous) solutions of precursor compounds. Such depositions are particularly prone to abrasion damage unless suitably treated.

Particles deposited by EP exhibit chemical properties different from those of evaporated metal layers, as shown for example by their behaviour towards solutions containing hydrogen peroxide. It has been proposed to improve the corrosion resistance of evaporated cobalt films by treatment of the films with dilute aqueous solutions of EDTA, hydrogen peroxide and sodium hydroxide for several, say 10-20, minutes. When such solutions are applied to EP metal layers under similar conditions, we have found that the treatment quickly destroys the metal layer. The problem, we found, was the hydrogen peroxide. If EP tape is immersed in a strong aqueous solution of hydrogen peroxide, at ambient temperatures, the cobalt coating is destroyed within seconds. After a very short period of time, the cobalt layer starts to discolour, going to a brown shade, and then very quickly breaks up. Microscopic observation revealed that at the onset of disclouration, a number of tiny holes appear in the cobalt layer, these holes expanding rapidly as the layer starts visibly to disintegrate. This rapid disintegration of the layer can be observed even with quite dilute hydrogen peroxide solutions, e.g. with the 0.5% aqueous solution of hydrogen peroxide containing EDTA and sodium hydroxide referred to above.

We have now found that solutions of certain organic peroxides do not cause EP metal layers to disintegrate and that they produce a metal layer which is much more resistant to abrasion than the untreated layer.

According to the invention there is provided a method for treating the surface of an electroless plated ferromagnetic recording layer to enhance its abrasion resistance which comprises applying a solution of a long chain organic peroxide to the surface.

The long chain organic peroxides can be applied to the surface of the recording layer as a solution in organic solvents, such as isopropyl alcohol, and being in general moderately stable solids at room temperature, they remain on the surface of the recording layer after removal of the solvent by evaporation. The organic peroxide does not appear to interfere with the performance of the recording layer, and since the long chain groups of the peroxide confer lubricant properties, the peroxide or residues thereof remaining after treatment should be retained to lubricate the surface of the recording layer. This may even obviate the need for a separate application of a lubricant.

The length of the carbon chains in the long chain organic peroxide are preferably from 8 to about 20 carbon atoms. We particularly prefer that the carbon chains be linear aliphatic groups containing at least 10 carbon atoms. Good results have been obtained using lauroyl peroxide, $C_{11}H_{23}CO-OO-CO\ C_{11}H_{23}$ (sometimes called dilauroyl peroxide).

The amount of the organic peroxide applied to the surface of the recording layer is readily controlled by varying the concentration of the peroxide solution and/or by controlling the thickness of the layer of solution applied to the surface. In practice we have found that only small amounts of organic peroxide are required to effect enhancement of the abrasion resistance of the recording layer, such as that left, for example, after applying a thin layer of a dilute (e.g. 0.2 to 0.5 percent by weight) peroxide solution to the surface, and allowing it to evaporate.

In a preferred technique the thickness of the layer of organic peroxide solution applied over the recording layer is a few, for example 2 or 3, microns and such a thin layer can be applied by wiping the surface of the recording layer, which itself is usually about 0.1 $\mu$m thick, with a tissue or sponge impregnated with the peroxide solution. Alternatively, very thin layers of solution can be applied by a variety of well-known techniques such as spraying, brushing, doctoring, kissing and roller-coating. These techniques can also be used to apply thicker layers of solution, for instance up to about 10 $\mu$m as also can simple dipping techniques.

In many cases, especially where very thin layers of the peroxide solution are employed, the solvent of the peroxide solution can be allowed to evaporate from the recording layer at ambient temperature and without blowing air or another fluid over the surface. Warm, dry air blown across the surface is a useful aid to rapid removal of thicker layers of solvent, and the recording tape may also be heated directly, to advantage. Any temperature may be employed at which the recording layer and its support remain undamaged, for example up to about 80° C. Some organic peroxides melt at temperatures below this, e.g. lauroyl peroxide melts at about 53-55° C. Temperatures above such melt temperatures not only evaporate the solvent more readily, but also lead to a more uniform film of the peroxide as it melts. Decomposition of the peroxide on the recording surface, which appears to be beneficial, is also speeded up by such elevated temperatures, and a preferred method is one in which the recording layer is raised to a temperature above the melting temperature of the organic peroxide.

Organic peroxide solutions in an aliphatic alcohol such as isopropyl alcohol are generally preferred on environmental considerations, although any solvent for the peroxide may be employed, chloroform generally being particularly effective. Strong solutions (e.g. 10-20% w/w or higher) of peroxide in an appropriate solvent, e.g. chloroform, can be used. However, care is needed to remove excess and generally dilute solutions are preferred, although we still prefer that the solution strength be greater than 0.1%, as more dilute solutions require multiple applications in order to build up a sufficient enhancement of abrasion resistance. For most purposes we prefer to use a single application, and solutions within the range 0.1 to 1% w/w are usually appropriate. The solution may contain additives dissolved, dispersed or emulsified therein which may remain deposited on the recording layer when the solution is removed by evaporation. Examples of useful additives are EDTA and peroxide activators. Lubricants such as long-chain fatty acids, e.g. stearic acid, may be added, if desired, though these may be unnecessary if the organic peroxide or its residues are retained after the treatment.

The treatment with a long chain organic peroxide according to the present invention may be in addition to treatment of the surface of the recording layer with aqueous hydrogen peroxide solution. The treatments can be carried out simultaneously or sequentially, of the latter we prefer to treat with aqueous hydrogen peroxide before applying the organic peroxide. Since, as described hereinbefore, hydrogen peroxide readily causes disintegration of metal layers, the treatment with hydrogen peroxide needs to be terminated prior to the onset of noticable disintegration of the recording layer. In particular we prefer to effect removal of the hydrogen peroxide within a period of about 10 seconds.

The process of the invention is applicable to recording layers comprising any ferromagnetic material but is especially applicable to layers comprising cobalt which may be essentially cobalt (i.e. may contain up to a few percent of other elements, e.g. phosphorus), an alloy of cobalt or a mixture of cobalt with another metal for example nickel.

The invention is illustrated by the following examples.

EXAMPLE 1

Lengths of coated polyester suitable for making up into video tape and comprising a polyester support tape EP-coated with a cobalt recording layer were placed with the recording layer uppermost on a flat glass plate of size $10 \times 15 \times 0.4$ cm and secured with adhesive tape.

Pads of paper tissues soaked in 0.5% w/w lauroyl peroxide solution in isopropyl alcohol were wiped over the surface of the tapes to provide a layer of the solution of thickness approximately 2 $\mu$m The isopropyl alcohol was immediately allowed to evaporate from the surface of the sample at ambient temperature.

The abrasion resistance of the treated surface of the cobalt recording layer was determined by means of a scrubbing test on an REL Abrasion Test Equipment commonly used to evaluate paint films. The equipment comprises six arms which move to and fro over the tape surface. Each arm was loaded with a 500 g weight and provided with a pad of paper tissue in contact with the surface of the recording layer. The number of scrubs, i.e. the number of times the pad moves over the surface, is counted on a counter.

It was observed in a series of abrasion tests that after 9,000 scrubs the samples exhibited visible evidence of a few light surface scratches but in all samples removal of cobalt from the surface of the recording layer was only slight.

The above procedure was repeated using a 0.2% w/w solution of the peroxide. After 5,000 scrubs in the scrubbing test, the samples exhibited light surface scratches and slight removal of cobalt from the surface.

For purposes of comparison the abrasion test was performed on samples of the untreated coated polyester tape. In this case the test was ceased after 200 scrubs. It was observed that the cobalt recording layer was quickly removed leaving bare patches and that after 200 scrubs (and in some cases after only 100 scrubs) virtually all of the cobalt had been removed.

Again for purposes of comparison a sample of the coated polyester tape was subjected to the treatment hitherto proposed for evaporated cobalt tapes, i.e. immersion for 10-20 minutes in a 0.5% w/v solution of hydrogen peroxide containing EDTA and sodium hydroxide. It was observed that the cobalt recording layer rapidly became discoloured and within a few minutes had completely disintegrated.

EXAMPLE 2

Using the procedure described in Example 1, samples of EP-coated polyester tape were each coated by wiping with a 30% w/v aqueous hydrogen peroxide solution to provide a 2$\mu$m thick layer of the solution. The solution was immediately allowed to evaporate from the surface at ambient temperature. The samples were then coated by wiping with a 0.2% w w solution of lauroyl peroxide in isopropyl alcohol to provide a 2 $\mu$m thick layer of the solution. The isopropyl alcohol was allowed to evaporate at ambient temperature.

The resulting samples were subjected to the abrasion test with the result that after 7,000 scrubs the surface of the cobalt recording layer was barely damaged and hardly any removal of cobalt had occurred.

EXAMPLE 3

0.2 g dilauroyl peroxide were dissolved in isopropyl alcohol, 2 ml of 30% w/v aqueous hydrogen peroxide were added dropwise, and the solution made up to 100 g with isopropyl alcohol. The resulting solution was then used to treat EP-coated tape in the manner described in Example 1.

The treated cobalt surface was then subjected to the scrubbing test on the REL abrasion test machine used in the other Examples. After 5000 scrubs there were a few scratches but hardly any of the cobalt had been removed. This again bears very favourable comparison with the havoc wreaked by such tests on untreated surfaces in less than 200 scrubs, as described in Example 1.

EXAMPLE 4

Lengths of polyester support tape EP-coated with a cobalt recording layer were placed with the recording layer uppermost on a flat glass plate of size $10 \times 15 \times 0.4$ cm and secured with adhesive tape.

The tapes were coated as in Example 1 except that 0.5% w/w solution of octanoyl peroxide (i.e having two octanoyl chains linked by the peroxide) in isopropanol was used. After 2000 scrubs some of the cobalt was removed but most remained on the tape. With an untreated sample tested in the same way, nearly all of the cobalt was removed after 200 scrubs.

Improvements of varying degree can also be obtained with the other long chain acyl peroxides. Nonoyl and decanoly peroxides give similar results to those of the above Examples, but in general the longer the chain, the better is the improvement obtained.

I claim:

1. A method for treating the surface of an electroless plated ferromagnetic recording layer to enhance its abrasion resistance, which comprises applying to the surface a dilute solution comprising 0.1 to 1% by weight of organic peroxide having carbon chains containing 8-20 carbon atoms in the absence of any organic material polymerisable by the peroxide solution.

2. A method as claimed in claim 1 wherein the organic peroxide comprises linear aliphatic groups containing at least 10 carbon atoms.

3. A method as claimed in claim 2 wherein the organic peroxide is lauroyl peroxide.

4. A method as claimed in claim 1 wherein the peroxide is applied as a thin layer and allowed or caused to dry by evaporation of the solvent.

5. A method as claim 1 wherein the ferromagnetic layer and its applied organic peroxide are heated to a temperature above the melting temperature of the organic peroxide, but below that which would cause damage to materials supporting the recording layer.

6. A method as claimed in claim 1 wherein the layer of electroless plated ferromagnetic material is treated with hydrogen peroxide in addition to the organic peroxide, the treatments being carried out simultaneously or sequentially, the hydrogen peroxide treatment being terminated prior to the onset of any noticeable disintegration of the recording layer.

7. A method as claimed in claim 6, wherein the treatment with hydrogen peroxide is carried out before applying the organic peroxide.

8. A method as claimed in claim 1 in which the ferromagnetic material is essentially cobalt, an alloy of cobalt or a mixture of cobalt with another metal.

* * * * *